Oct. 10, 1944.   H. J. MURRAY   2,360,259
FLUID DRIVE POWER TRANSMISSION MECHANISM
Filed May 10, 1941
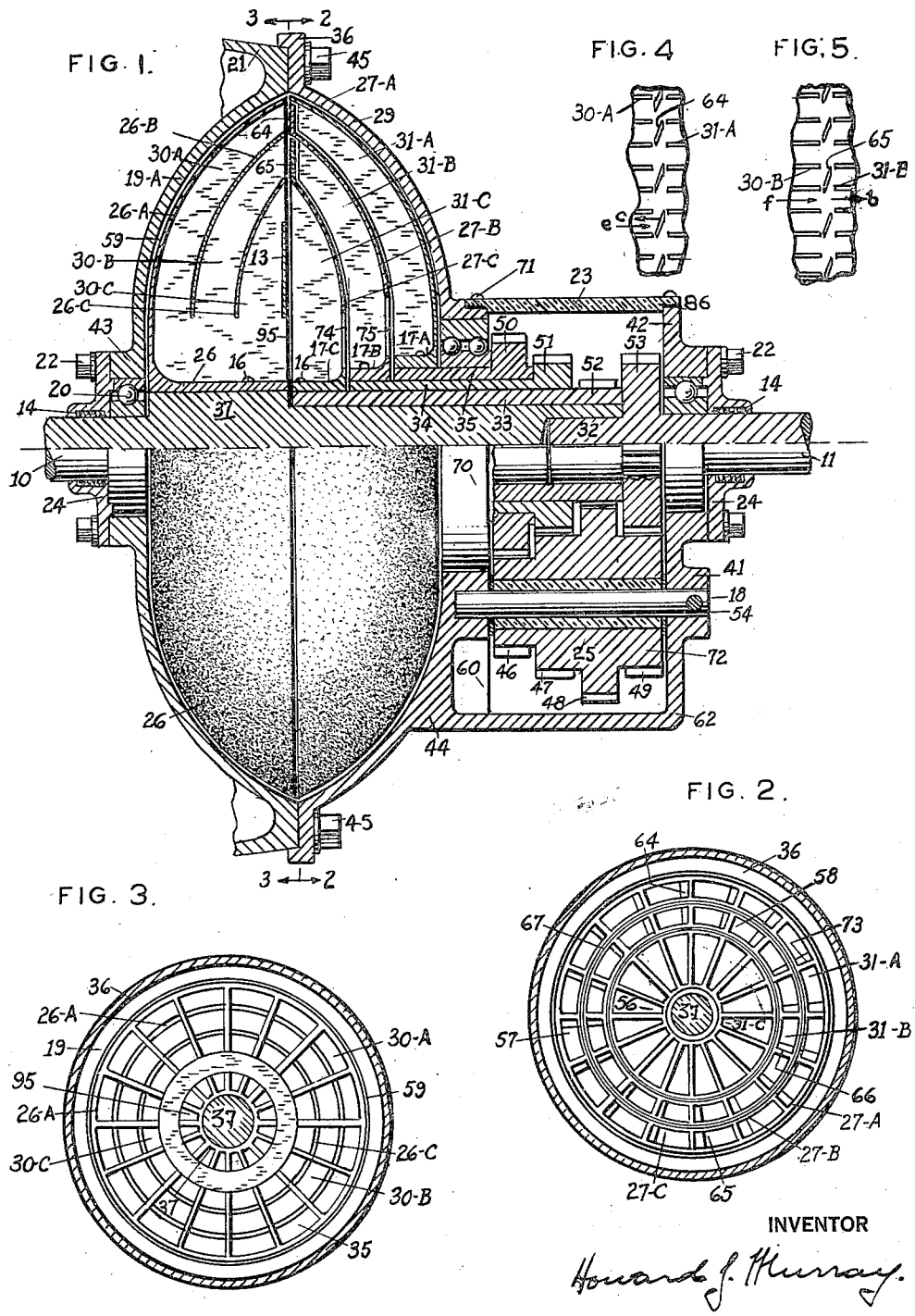
INVENTOR
Howard J. Murray.

Patented Oct. 10, 1944

2,360,259

UNITED STATES PATENT OFFICE 2,360,259

FLUID DRIVE POWER TRANSMISSION MECHANISM

Howard J. Murray, New York, N. Y.

Application May 10, 1941, Serial No. 392,922

11 Claims. (Cl. 74—189.5)

My invention relates in general to a fluid drive transmission mechanism and specifically relates to a device for affecting and effecting fluid drive relations between driving and driven members of a power transmission mechanism.

One of the objects of the present disclosure is to provide a simple form of compound fluid drive mechanism arranged to derive fluid drive control power from the driving member and thence employ the said derived control power micromatically so as to effect and affect drive relations of the mechanism members.

A further object of the present disclosure is to provide an automatic variable speed fluid drive transmission with the various parts so arranged as to be automatically controlled in their fluid drive action by torque responsive fluid controlled elements obtaining control power from one of the power members of the said transmission according to the relative movement of the said members.

An additional object of the present disclosure is to employ torque responsive multi-drive fluid means so as to control the speed-torque transmission of power from a driving member to a driven member under such conditions that the said driving and driven members will automatically acquire proper speed-torque drive relations.

A still additional object of the present disclosure is to provide a plurality of operatively associated fluid drive couples individually and collectively in fluid drive relation so that torque responsive fluid drive relations between the driving and driven members of the mechanism is effected as a co-incidental function of the normal operation of the vehicle upon which the mechanism is installed and operated.

A still further object of the present invention is to provide a plurality of fluid drive couple elements mounted for rotation about a common axis so that certain of the said elements will have a common speed of rotation and certain others will have different relative speeds of rotation.

The present disclosure also contemplates the use of biaxial and bidirectional fluid drive means including cammed fluid drive control impeller portions actuated by power derived from the driving member according to the torque load on the driven member.

The present disclosure is a further development of some of the novelties disclosed in my U. S. Patent No. 2,143,711, issued January 10, 1939—my U. S. Patent No. 2,208,224, issued July 16, 1940—my U. S. application Serial No. 353,441, filed August 21, 1940—my U. S. application Serial No. 367,944, filed November 30, 1940, and my U. S. application Serial No. 379,477, filed February 18, 1941.

While the present invention is obviously capable of use in any location wherein it is desired to transmit power with torque responsive fluid drive relations from one power member to another, the present invention is particularly applicable to a selective fluid drive power transmission mechanism for use in connection with automotive vehicle construction, and it is in this connection that embodiments of the present invention will be described in detail.

Figure 1 is an embodiment of the present invention partly in vertical section taken axially of the main shaft.

Figure 2 is an end view in vertical elevation of the fluid drive couple elements and fluid drive control portions taken along the line 2—2 of Figure 1 looking in the direction indicated by the arrows.

Figure 3 is also an end view in vertical elevation of the fluid drive couple elements with a common connection to one of the power members of the mechanism taken along the line 3—3 of Figure 1 looking in the direction indicated by the arrows.

Figure 4 is a diagrammatic presentation of a section of a plan view of the operating relation of the fluid drive couple elements and associated fluid drive control portions of Figure 1.

Figure 5 is a plan view of the means of Figure 4 except that the relative motions of the elements and portions are changed.

In the following description and in the claims, parts will be identified by specific names for convenience of expression, but they are intended to be as generic in their application to similar parts as the art will permit.

There is shown by Figure 1 of the drawing a novel micromatic fluid drive means and associated power transmission parts including a pair of power shafts 10 and 11 disposed in axial alignment with their adjacent ends including the reduced portions 32 and 37 interfitted so as to provide proper bearing surfaces.

The power shafts 10 and 11 are mounted for independent rotary movement respectively in suitable bearings 20.

While either of these power shafts 10 and 11 may be considered as the normal driving member of the said mechanism, it will be understood for the purpose of this description that the shaft 10 is the normal driving member, and is operatively connected to be driven from a source of power (not shown) such as an internal combustion engine.

Accordingly shaft 11 is regarded as the normal driven member, and is drive connected to whatever mechanism (not shown) it is desired to drive.

The shafts 10 and 11 are preferably made of a good quality of steel and the shaft 11 is formed with the radially extending toothed portion 53. The portion 37 of member 10 is formed to operatively receive and rotatably support the member 33 formed with the toothed portion 52. A second tubular member 34 is supported for rotation on the member 33 and is formed with the toothed portion 51. A third tubular member 35 is mounted for rotation on the member 34 and is formed with the toothed portion 50.

A fluid drive couple element 17—A including the curved radially extending portion 27—A and the fluid drive vanes 31—A is rigidly mounted on the member 35 for rotation therewith. A second fluid drive couple element 17—B including the curved portion 27—B and the fluid vanes 31—B is rigidly mounted on the member 34 by means of the screws 16 for rotation therewith. A third fluid drive couple element 17—C including the portion 27—C, openings 74 and the fluid drive vanes 31—C is rigidly mounted on the member 33 by means of the screws 16 for rotation therewith. The member 17—B is also provided with the openings 75.

A fluid drive member 26 including a plurality of fluid drive couple elements formed by the radially extending curved portions 26—A, 26—B and 26—C and the fluid drive vanes 30—A, 30—B and 30—C is rigidly connected to the normally driving member 10 by means of the screws 16. It is evident that the fluid drive couple elements formed by the said portions of the fluid drive member 26 have a common drive connection 37 to the normally driving member 10 and that the fluid drive couple elements of members 17—A, 17—B and 17—C have unlike drive relations with the normally driven member 11.

The radially extending fluid drive control portions 64 and 65 of Figures 1, 2, 4 and 5 may be formed integral with the curved elements 27—C and 27—B of Figure 1, or they may be made separately and attached to the said curved portions 27—C and 27—B by any suitable conventional means or manner. The portion 64 is shown in plan view by Figure 4, and portion 65 is shown in plan view by Figure 5. The portion 64 thus rotates about the common axis of the members 10 and 11 and passes bidirectionally between the vanes 30—A and 31—A. In the same manner the portion 65 passes between the vanes 30—B and 31—B.

All of the fluid drive members 26, 17—C, 17—B and 17—A and associated parts of Figure 1 together with the tubular members 33, 34 and 35 are shown as mounted on the driving member 10 for rotation about a common axis. The bearings 20 in turn supporting the members 10 and 11 are in turn supported and positioned by the casings 19—A and 29. The bearings 20 are axially positioned by the end members 24 secured to the said casings by means of the bolts 22. The casings 19—A and 29 are secured together by means of the bolts 45 in alignment by means of the lip portions 36. A gasket of a desired conventional form and material may be placed between the casings 19—A and 29 so as to make the enclosure formed by the said casings, said end members and said members 10 and 11 leak proof or approximately so.

The elements of Figure 1 are so formed relative to each other as to provide the spaces 59 and 95 between the parts. A baffle plate 13 is attached to the vanes 30—C as shown by Figure 1.

The casing 19—A is formed with an enlarged portion 43 to strengthen the said casing at the bearing support portion and in addition with a bell shaped portion 21 for attaching the mechanism to a vehicle or other supporting means.

The casing 29 is formed with an axially extending portion 44 formed with the opening 42 to permit the installation and housing of the countershaft gear cluster 72 formed with the groups of teeth 46, 47, 48 and 49 constantly in mesh drive relation with the mating teeth groups 50, 51, 52 and 53. This axial extension 44 is also formed with and end portion 41 arranged to receive and position the intermediate shaft 54 held in position by means of the cotter pin 18. The cluster 72 is provided with the bronze bearing 25. A cover 23 is held in position after the gasket 86 and the cluster 72 is in position. The screws 71 are used to secure the cover 23.

For the purpose of this description, let it be assumed that all the fluid drive vanes 30—A, 30—B, 30—C, 31—A, 31—B and 31—C lie in planes passing through the common axis of the member 10.

The fluid drive control portions 64 and 65 are assumed to be formed integral with the curved portions 27—C and 27—B. Thus the fluid control portions 64 of Figure 4 will pass between the vanes 30—A and 31—A with the speed of the vanes 31—B. In the same manner the portions 65 will pass between the vanes 30—B and 31—B at the speed of the vanes 31—C.

The cluster is held in position as the shaft 54 is moved to the position shown by Figure 1, after which the cotter pin 18 is placed. The bearing 70 is placed on the tubular member 35 after which the fluid drive member 17—A is fixed by means of the screws 16. Next the tubular member 34 is moved into position within the tubular member 35 and the fluid drive member 17—B is secured by means of the screws 16. Next the tubular member 33 is moved into position in the member 34 and the fluid drive member 17—C secured by means of the screws 16. After the member 26 has been secured to the portion 37 of the member 10, the tubular members and associated parts and the bearing 70 may be moved into position on the portion 37 with the member 10 provided with the bearing 20.

After the member 11 and the bearing 20 are in position so that the members portions 49 and 53 are in mesh, the member 10 and its supported means may be moved so that the members 10 and 11 will be interfitted as shown by Figure 1. The casing 19—A can now be moved on to the bearing 21 and secured to the casing 29 by means of the bolts 45. The ends (or end pieces) 24 are provided with packing material 14 are secured to the casings by means of the bolts 22.

In operation, let it be assumed that the source of power (not shown) is connected to the normally driving member 10 by means of a conventional foot clutch as commonly found on self-propelled vehicles, altho it is possible according to the present disclosure to operate the mechanism when it is directly connected to the source of power (not shown).

Let it be further assumed, for the purpose of this description that the said source of power when connected to the normally driving member 10 will normally rotate the same clockwise when viewed from the left hand end of Figure 1. The device to be driven such as an automotive vehicle, is assumed to be connected to the normally driven shaft 11 through a conventional reversing unit (not shown) and that the shaft 11 is normally driven in the same direction as the shaft 10.

The transmission casing enclosure formed by the casings 19—A and 29 and associated parts is assumed to be well filled with a suitable driving fluid medium (not shown), and that the fluid is supplied to and removed from the said enclosure by means of conventional fluid openings and fluid plugs (not shown).

Thus the fluid conducting paths formed by the fluid drive members 16, 17—A, 17—B and 17—C and associated parts will be well filled with the driving fluid. The spaces surrounding the other portions within the inclosure will also be well filed with the said fluid. In this event, the driving fluid also acts as a lubricating fluid.

All manner of drive relations exist between the driving and driven members of a self-propelled vehicle and also in conventional power transmitting mechanisms, and all manner of drive relations will exist between the members 10 and 11 in actual operation in the manner of and for the purpose intended. While any of these relations may be considered, let it be asumed for the purpose of this description that the normal driving member 10 is rotating clockwise at constant speed.

It is also true that many combinations of gear sets may be employed and that more than three sets may be used, and that the ratio of the teeth of portions 46 and 53 may be varied to further vary the drive relations of the members 10 and 11. Because it is necessary to assume a set of conditions in order to explain the operation of the device, such a set will be considered. The gear sets used will be such that when the members 26, 17—A, 17—B and 17—C are all rotating about the common axis of the member 10 with the vanes 30—A and 31—A rotating at the same speed, the speed of the member 11 will be greater clockwise than the member 10. The clockwise rotation of the vanes 31—B will be greater than the clockwise rotation of the vanes 31—A, and the clockwise speed of the vanes 31—C will be greater than the clockwise speed of the vanes 31—B.

Now let it be assumed that a slight torque load is impressed on the normally driven member 11 to the extent that the clockwise speed of the member 11 will be decreased to approach the clockwise speed of the normally driving member 10. The speed of the fluid drive paths formed by the curved member portion 27—A and the vanes 31—A will decrease to rotate slower clockwise than the common drive connected fluid drive paths formed by the elements of the member 26. The speed of the curved portion 27—B will also decrease clockwise but will still be greater than the speed of the member 26 and of course greater clockwise than the speed of the curved portion 27—A.

A pressure gradient will be imparted to the fluid in the paths including the vanes 30—A and the curved portions 26—A and 26—B which will be greater radially than the gradient formed in the fluid drive paths formed by the vanes 31—A and the curved portions 27—A and 27—B. Thus the fluid will flow clockwise in these paths from one to the other through the openings 74 and 75. The cammed impeller portions 64 of the curved portion 27—B are rotating faster than the member 26 as hereinbefore described and thus the cammed portions 64 will act to aid the clockwise flow of the fluid to increase the fluid drive action against the driven vanes 31—A.

This action between the means of Figure 1 will continue as long as the impressed torque on the member 11 is constant. The action of the portions 64 may be varied by changing the angle and number of the impeller portions 64.

The fluid flow in the paths formed by the vanes 31—B and the curved portions 27—B and 27—C and the paths formed by the vanes 30—B and the curved portions 26—B and 26—C will be counterclockwise because the pressure gradient will be greater in the faster clock-wise moving paths formed by the vanes 31—B and the curved portions 27—B and 27—C. But the cammed impeller portions 65 forming a portion of the faster clockwise rotating curved member 27—C will oppose this counter-clockwise motion of the fluid to counteract the pressure gradient induced in the paths formed by the vanes 31—B and the curved portions 27—B and 27—C.

In order to simplify the present description, the fluid paths formed to include the vanes 30—A and 31—A will be identified as the outer paths. The paths including the vanes 30—B and 31—B will be identified as the center paths, and the paths including the vanes 30—C and 31—C will be identified as the inner paths.

Thus with the relatively slight torque load impressed on the member 11, the fluid will move clockwise aided by the portions 64 in the outer paths, counter-clockwise opposed by the portions 65 in the central paths and counter-clockwise in the inner paths. The member 11 will be rotating clockwise faster than the member 10 and power will be transmitted under overspeed drive conditions.

Now let it be assumed that the load torque impressed on the member 11 is increased. The speed of the member 11 will decrease clockwise. The speeds of the members 17—A, 17—B and 17—C will also decrease clockwise. The member 17—A will decrease faster than the member 17—B in turn decreasing faster than the member 17—C. The potential gradient between the driving and driven outer paths will increase and thus the fluid drive action will increase. The aiding action of the impeller portions 64 will decrease and the fluid drive opposing action of the impeller portions 65 will also decrease.

As the impressed load torque on the member 11 is still further increased, the speed of the said member will normally decrease. The clockwise speed of the outer driven fluid path of member 17—A will decrease to increase the fluid drive action of the outer driving fluid path of the member 26. Eventually the clockwise speed of the fluid paths of the members 17—A, 17—B and 17—C will decrease until the speed of the members 17—B and 26 will be the same clockwise speed. The fluid drive aiding action of the portions 64 will cease at this common speed of members 17—B and 26. The opposing action of the portions 65 to the counterclockwise flow of the fluid in the paths of the member 17—B has decreased.

With still further increase of impressed torque on the member 11, the clockwise speed of the curved portion of member 17—B will become less than the clockwise speed of the member 26. Up to this time any power transmitted from the member 10 to the gearing elements of Figure 1 has traversed the outer fluid drive paths to the gear set 50—46. This power has then been transmitted to the member 11 at a torque determined by the gear sets 50—46 and 49—53, and also to the members 33 and 34 to the central and inner fluid drive paths to produce counter-clockwise motion of the fluid in the said paths and to also move the portions 64 and 65. The transmission mechanism has thus been in overspeed drive operation.

When the portions 64 have decreased in clockwise speed to the speed of the member 26 they are definitely opposing the clockwise motion of the driving fluid in the outer fluid path of the member 26. With proper design, the driving action of the fluid in the outer paths will be fairly constant over a predetermined speed band as the torque is increased on the member 11 (member 10 rotating at constant speed). However, as the speed of the portions 64 approach and pass the clockwise speed of the outer path of the member 26, the fluid driving action of the outer paths decrease as the fluid driving action of the central paths increase.

This is true, because the blocking action of the portions 64 rapidly increase when they are not moved through the fluid fast enough to aid its axial motion. By providing the portions 64 with proper angle and number, it is obvious that the said blocking action will be relatively great even though there is no relative motion between the members 26 and 17—B as the fluid is moving clockwise due to the gradient produced due to the speed of the member 10 and thus the member 26. As the clockwise speed of the member 17—B becomes less than the clockwise speed of the member 26 to cause relative motion between the vanes 30—A and the portions 64, this blocking action will be further increased.

As the member 17—B decreases in clockwise speed below that of member 26, the fluid in the central paths changes from a counter-clockwise motion to a clockwise motion. This motion is now aided by the impellers 65 forming a portion of the member 17—C.

As the torque on member 11 is now still further increased the driving action of the central paths will increase as the driving action of the outer paths decrease. The fluid driving action of the outer paths has been approximately constant up to this time as the increase of fluid drive action has been offset by the increase in blocking action by the portions 64.

With increase in difference in speed of the members 17—B and 26, the driving action of the central paths will increase and the driving action of the outer paths will decrease. The driving load will be transferred from the gear set 46—50 to the gear set 47—51. Let it be assumed that gear sets 47—51 and 49—53 are the same, and thus direct drive gear sets. This transfer from one gear set to another, or the change from overspeed to direct drive relation will be gradual or micromatic. It will be a function of the increase in the load torque compressed on the member 11. There will be no shock or jar and it will not be necessary to operate the conventional clutch as commonly found on automotive vehicles.

With still further torque increase on the member 11, the speed of the portions 65 will pass that of the member 26. The portions 65 will now oppose the fluid drive action of the fluid of the central paths in the same manner as the portions 64 oppose the fluid drive action of the fluid of the outer paths as hereinbefore described. The fluid motion of the inner paths will change from counter-clockwise to clockwise and the driving load will be shifted from gear set 47—51 to gear set 48—52 and the mechanism will be in low speed transmitting relation.

These changes in driving relation between the members 10 and 11 as just described have been sequential, progressive and micromatic and as a function of the torque load impressed on the normally driven member 11. The said drive relations have been effected without jar or shock, and without valves, springs or manual control.

As the torque on the member is now decreased, the action just described will be reversed. If the torque is varied, the mechanism will automatically follow the variation because the fluid drive action is always a function of the imposed torque on the driven member 11.

When the normal driving member 10 becomes a variable speed member as is encountered in the actual operation of a conventional self-propelled vehicle, then the mechanism of Figure 1 may be controlled manually as a co-incidental function of the operation of the vehicle upon which the device is installed and operated.

This is true, because the speed of the member 10 may be manually varied to vary the fluid drive action of the mechanism.

Now let it be assumed that the normally driven member 11 becomes the driving member to drive the member 10 against engine compression. Let it be further assumed that the load torque impressed on the member 10 is at a minimum. With the particular gearing arrangement shown by Figure 1 for the purpose of this description all of the vanes 31—A, 31—B and 31—C will be rotated clockwise. The vanes 31—C will be rotated faster than the vanes 31—B in turn rotated faster than the vanes 31—A.

The motion of the fluid in the paths of the members 17—A, 17—B and 17—C will all tend to be counter-clockwise due to the potential gradients in the said paths. The portions 64 and 65 will tend to oppose this counter-clockwise fluid motion in the outer and central paths. There will be no opposition to the fluid of the inner paths except that offered by the vanes 30—C.

Thus the mechanism will automatically tend to transfer the driving action to the fluid drive couple including the vanes 30—C and 31—C, but this automatic transfering action will vary according to the actual as well as the relative speeds of the members as hereinafter described.

It should be noted at this time that there are many ways of forming, assembling and employing the radially extending impeller portions 64 and 65. If the cammed portions are curved as shown in Figure 2 instead of straight as shown in Figures 4 and 5 it is obvious that there would be an axial difference in the aiding or opposing effect of the said impellers. Also the effective angle the impellers make relative to a plane at right angles to the axis of the member 10 must be determined in order to cause the mechanism to work in the manner of and for the purpose intended. If the said impellers are curved, it is obvious that the blocking action of the impellers 64 when rotating at the same speed as the vanes 30—A could be shaped to direct the fluid to oppose the clockwise motion of the vanes 31—A. Thus the momentum of the fluid from the vanes 30—A could be employed to either aid or oppose the vanes 30—A with the impellers 64 in effect at rest with respect to the vanes 30—A. Thus the form of the impellers 64 and 65 are a fluid drive control factor without regard to the motion of the portions 64 and 65.

When the member 11 is the driving member, the form of the impellers will also effect the fluid drive relation between the members 10 and 11. For the purpose of this description, let it be assumed that the impeller portions 64 and 65 are straight as shown in Figures 4 and 5. Let it be further assumed that the vehicle upon which the mechanism is installed and operated is moving down grade against engine compression. The tendency of the impellers 64 and 65 to oppose the counter-clockwise motion of the drive fluid in the outer and central paths will tend to transfer the driving action to the gear set 48—52 to thus cause the fluid of the inner fluid drive path to fluid drive the normally driving member 10 faster clockwise than the speed of the now driving member 11. But, any increase of speed of the member 10 will increase the torque load impressed upon the said member 10 by the engine compression action. If the grade increases, the speed of the vehicle and thus the member 11 will normally increase. Any increase of the member 10 will increase the speed of the member 11 to a greater extent because of the gear set and this will in turn increase the torque load on the member 10. There may be some fluid drive action left in the fluid in the outer and central paths which would co-operate with the fluid drive action of the fluid in the inner paths, but the device inherently and automatically will tend to hold the vehicle to approximately a predetermined speed. Conventionally it would be the same as going into second speed.

When operating the vehicle down grade, the speed may be maintained by the gas pedal, but in the event of removing the foot from the pedal, whether from desire, failure of the vehicle breaking means or because of illness or confusion of the vehicle operator, the present device will automatically act to slow down or maintain the vehicle.

According to the present disclosure, the vehicle would be operated entirely by the fuel supply control except when reversing. The clutch as commonly found on automotive vehicles may be employed, but it is contemplated that the present device will be operated without any clutch. Whether or not a clutch will be used will be determined by the manner of and the purpose for which the device will be installed and operated.

In conclusion, it will be understood that the present disclosure provides means of and for affecting and effecting fluid drive relations between driving and driven members as a function of the difference in speed of the said members. That means are provided for employing the fluid drive medium of a fluid drive mechanism positioned between two power transmitting members so as to micromatically control the manner in which power will be transmitted from one member to another.

That fluid drive power transmitting means are provided to automatically vary speed-torque drive relations between drive elements of a fluid drive power transmission device as a co-incidental function of the normal operation of the vehicle upon which the device is installed.

That means are provided for employing a plurality of pressures of a fluid drive medium according to the extent and direction of said pressures to cause the torque responsive transmission from one rotor to another.

While I have shown and described and have pointed out in the annexed claims certain new and novel features of my invention, it will be understood that certain well known equivalents of the elements illustrated may be used, and that various other substitutions, omissions and changes in the form and details of the device illustrated and in its operation may be made by those skilled in the art without departing from the spirit of my invention.

Having thus described my invention, I claim:

1. In a device of the class described, means including a pair of power members, a fluid, a plurality of speed sets drive connected to a common speed set in turn drive related to one of the members, a plurality of runners each mounted for rotation with a different concentric shaft, said shafts respectively connected to the said speed sets, an impeller connected to the other said member and in fluid drive relation with the said runners, and drive control portions rotatable with one of the said runners in the said fluid and fluid drive related to another of said runners and one of the said impellers.

2. In a torque converting mechanism, a pair of power members, a fluid, a plurality of speed sets drive connected to a common drive set, said common set also drive connected to one of the said power members, a plurality of nestled runners connected respectively to concentric shafts and therethrough to the said speed sets, an impeller formed with a common drive connection to the other power member and in universal fluid drive relation with the said runners, and fluid drive means mounted for rotation with one of the said runners and including portions positioned in the said fluid between another of the said runners and the said impeller.

3. In a device of the class described, the combination including a driving member and a driven member, a fluid, a plurality of speed sets drive connected to a common drive set drive related to the driven member, a plurality of runners, means constituting a plurality of concentric shafts for respectively drive connecting the said runners to the said speed sets, means constituting a plurality of concentric impeller paths formed with a common drive connection to the said driving member and in fluid drive relation to the said runners, and fluid control means formed for rotation with one of the said runners and including portions operatively positioned in the said fluid between another one of the said runners and the said impeller means so as to drive and be driven by the said fluid.

4. In a device of the class described, the combination of a normally driving member and a normally driven member, a fluid medium, a plurality of speed sets respectively drive related to a common drive set drive connected to the said normally driven member, a plurality of fluid runner elements, means constituting concentric shafts for respectively drive connecting the runners to the said speed sets, means constituting a plurality of integrally related concentric integral impeller paths, common means for positively drive connecting the impeller paths to the said normally driving member, said runners and said impeller paths positioned in the said fluid so as to become fluid drive related when rotated relative thereto, and fluid flow control portions formed with one of the said runners and operatively extending between an impeller path and another runner so as to drive and be driven by the said fluid by power derived from the said normally driving member, said portions also drive and driven by the said fluid as the normally driven member becomes the driving member.

5. In a device of the class described, the combination including a fluid medium, a driving member, a driven member and an automatic fluid torque converting mechanism operatively positioned therebetween, a pair of casings substantially enclosing said members and entirely enclosing said mechanism so as to cause same to be submerged in said fluid, said mechanism including a cluster of impeller paths integrally drive related to the said driven member, a plurality of nestled runner elements respectively mounted for relative rotation on a plurality of concentric shafts, a plurality of speed sets respectively drive related to the said runners by means of the said shafts and collectively drive related through a common drive set to the said driving member, a plurality of blade like portions formed integral with one of the runners and radially extending so as to be operatively positioned in the said fluid between the elements of a fluid drive coupling, said elements constituting another runner and an impeller.

6. In a device of the class described, the combination of means including a driving member, a driven member, a multi-part casing, a fluid medium and a micromatic speed-torque converting mechanism operatively positioned between the said members, said members mounted substantially within said casing, said mechanism normally submerged in said fluid, said mechanism including a plurality of speed sets drive connected through a common gear set to said driven member, a plurality of nestled runner elements mounted respectively on shafts for relative rotation, said shafts connected respectively to the said sets, a means constituting a plurality of integral impeller paths commonly drive related to the said driving member and slip-drive related to the said runners when moved in the said fluid relative thereto, and micromatic torque converting means including a plurality of cammed portions arranged to rotate with one of the runners and between one of the impeller paths and another runner.

7. In a speed-torque drive control means, the combination of means including a fluid, a pair of power members and a torque responsive multi-coupling organization in universal slip-drive relation about a common axis, a casing substantially enclosing said members and entirely enclosing said organization so as to operatively submerge same in the said fluid, said organization including a plurality of nestled fluid drive impeller elements normally acting as runner elements in respective speed drive relations with a common gear set also in drive relation with one of the said members and a plurality of integrally nestled runner elements normally acting as impeller elements in universal fluid drive relation with the other said nestled elements when moved relative thereto, said normally acting impeller elements arranged in common positive drive relation with the other said member, and a plurality of fluid drive control portions carried by one of the said normally acting runner elements and in universal fluid drive relation with certain of the other elements according to the speed drive relations of the said members.

8. In a torque converting mechanism, a pair of power members, a fluid, a plurality of speed sets drive connected to a common countershaft, said countershaft drive connected to one of the said power members, a plurality of nestled runners connected respectively to a plurality of concentric shafts respectively drive connected to the said speed sets, means constituting a plurality of fluid impeller paths arranged with a common drive connection to the other said power member and in universal fluid drive relation with the said runners when rotated relative thereto through the said fluid, and fluid drive control means carried by one of the runners and in universal fluid drive relation with certain of the other runners and impeller paths.

9. In a device of the class described, a pair of power members, a torque converting mechanism, a casing, a fluid, means for mounting said members and said mechanism about a common axis and substantially within said casing so as to be normally submerged within said fluid, said converting mechanism including fluid drive means constituting a plurality of fluid drive couplings nestled about said axis in universal fluid drive relation when rotated by power derived from one of the said members, said couples formed of a plurality of runner elements respectively speed drive connected to concentric shafts mounted for separate rotation about the said axis, said shafts respectively drive connected to speed sets, said speed sets drive connected to a common gear drive connected to one of the said members and means forming an equal number of fluid impeller paths integrally drive connected to the other power member, and fluid drive control portions mounted for rotation with a runner of one of the said couples and extending so as to be operatively positioned between the runner and impeller of another couple.

10. In a device of the class described, means comprising a pair of power members and a micro-matic torque converting mechanism mounted for fluid slip-drive relation about a common axis, a casing, a fluid medium and elements for mounting said members substantially within said casing and said mechanism entirely within said casing so as to normally be submerged in the said fluid, said mechanism including a plurality of fluid drive couples nestled about a common axis, said couples formed by means constituting a plurality of integrally related impeller paths connected to one of the members and a plurality of runners separately speed drive related to the other member one of said couples including fluid drive control portions operatively associated with another couple to vary its fluid drive action on the driven member by power derived from the driving power member.

11. A torque converting mechanism including a pair of power members, a fluid, an impeller drive related to one of the members, nestled runners fluid drive related to the impeller, means for respectively drive relating the runners to the other member, and fluid drive control means positioned between one of the said runners and the impeller and drive related to another runner.

HOWARD J. MURRAY.